United States Patent [19]

Chalk et al.

[11] Patent Number: 4,545,916

[45] Date of Patent: Oct. 8, 1985

[54] HEAT STORAGE MATERIALS

[75] Inventors: Christine D. Chalk, Buckinghamshire; Cecil Hayman, Hertfordshire, both of England

[73] Assignee: IC Gas International Limited, London, England

[21] Appl. No.: 513,097

[22] Filed: Jul. 12, 1983

[30] Foreign Application Priority Data

Jul. 15, 1982 [GB] United Kingdom ............... 8220589

[51] Int. Cl.[4] .......................... C09K 3/18; C09K 5/06
[52] U.S. Cl. ...................................... 252/70; 423/305
[58] Field of Search .......................................... 252/70

[56] References Cited

U.S. PATENT DOCUMENTS 4,273,667  6/1981  Kent et al. ............................ 252/70
4,426,307  1/1984  Wada et al. .......................... 252/70

FOREIGN PATENT DOCUMENTS 57-74380  5/1982  Japan ..................................... 252/70

OTHER PUBLICATIONS

Energy Technology, Third Annual Proceedings of Thermal Energy Contractors Information Exchange Meeting (Springfield, Virginia, Dec. 5-6th, 1978), pp. 133-142-S. Cantor, Principal Investigator.

*Primary Examiner*—Paul Lieberman
*Assistant Examiner*—Robert A. Wax

[57] ABSTRACT

The heat storage material, which undergoes reproducible transition in the range 66° to 74° C., comprises sodium pyrophosphate decahydrate ($Na_4P_2O_7 \cdot 10 H_2O$) dispersed throughout an open cell polymeric matrix which is stable in an aqueous medium at 80° C.

In use (for example, for space heating) the material is alternately heated to above 80° C. and cooled below its transition temperature with evolution of heat.

3 Claims, No Drawings

HEAT STORAGE MATERIALS

The present invention is concerned with materials which can store thermal energy as latent heat.

A large number of hydrated compounds, such as inorganic salts, are known which absorb latent heat at a characteristic transition temperature on transition to the anhydrous or a less hydrated crystal form, and release the latent heat on reversion to the more hydrated form when cooling to a temperature below the transition temperature.

A typical inorganic salt suitable for latent heat storage is sodium sulphate decahydrate $Na_2SO_4.10H_2O$, which undergoes transition to solid anhydrous sodium sulphate and a saturated solution of sodium sulphate, with absorption of latent heat at a constant theoretical (equilibrium) temperature of 32.38° C. on a heating cycle. When all the decahydrate has transformed to anhydrous salt and saturated solution, further heat input causes a rise in temperature (that is, the absorption of sensible heat). On cooling below the transition temperature, the decahydrate reforms, with the evolution of the absorbed latent heat.

A problem with the use of such hydrated salts for latent heat storage is the incongruency of phase transition when the low-temperature solid phase transforms to a two-phase condition in which solid and liquid coexist. In the two-phase condition, the difference in densities of the two phases causes segregation thereof, which limits their ability to recombine and form the low-temperature single solid phase. Consequently the amount of heat recoverable on cooling is reduced.

Various means of alleviating this problem have been proposed, two proposals being in our European Pat. Nos. 99 and 11411, in both of which there is disclosed a heat storage material in which a hydrated compound of the type described above is dispersed throughout a hydrogel comprising a water-swollen cross-linked polymer. In European Pat. No. 99, the cross-linked polymer is formed by cross-linking a water-soluble polymer having pendant carboxylic or sulphonic acid groups by means of cations of polyvalent metal (that is, cross-linking is via an ionic mechanism), while in European Pat. No. 11411, the cross-linked polymer is formed by cross-linking a water-soluble or water-dispersible synthetic hydrophilic polymer by a covalent cross-linking mechanism.

The choice of a particular hydrated salt is dictated by properties such as the amount of latent heat absorbed, the transition temperature, the reproducibility of the transition on repeated cycles and the stability of the salt in the heat storage system.

For domestic space heating appliances using, for example, off-peak electricity as energy input, a salt having a transition temperature of about 70° C. is desirable, but the choice of hydrated salts having a transition temperature this high is severely restricted. This is because the number of molecules of water of crystallisation involved in the transformation tends to become smaller at higher temperatures and also because of thermal instability of the hydrate salt at higher temperatures (for example, certain hydrated salts interact with thickening agents used to provide a uniform distribution of solid anhydrous salt, and nitrates undergo hydrolysis at higher temperatures).

Sodium pyrophosphate decahydrate ($Na_4P_2O_7.10H_2O$), which has a theoretical transition temperature of approximately 79° C., is one hydrated salt which might be considered for storage of thermal energy in space heating appliances, even though it is know to be metastable. It can undergo hydrolysis to form the orthophosphate in an aqueous medium; the rate of such hydrolysis is known to be influenced to varying degrees by the temperature, pH, the concentration and type of enzymes, complexing cations and other impurities which may be present.

The performance of sodium pyrophosphate decahydrate has been evaluated by Oak Ridge National Laboratory (U.S.A.), as reported in Energy Technology, Third Annual Proceedings of Thermal Energy Contractors Information Exchange Meeting (Springfield, Va., Dec. 5–6th, 1978). This report suggest that sodium pyrophosphate decahydrate is not a promising candidate for further development, as it was found to undergo substantial supercooling, to melt incongruently and to exhibit retrograde solubility above 79.5° C., all of which are undesirable. The report concludes that sodium pyrophosphate "would be a very inferior latent heat storage material even it (its) supercooling problems were solved".

We have now surprisingly found that sodium pyrophosphate decahydrate perform satisfactorily in a thermal energy storage material in which the salt is present in an open cell polymeric matrix.

According to the invention, therefore, there is provided a heat storage material which comprises sodium pyrophosphate decahydrate dispersed throughout an open cell polymeric matrix which is stable in an aqueous medium at 80° C.

The heat storage material according to the invention undergoes reproducible transitions in the range 66° to 74° C.

In one embodiment of the present invention, the polymeric matrix comprises a water-swollen cross-linked polymer hydrogel. Such a hydrogel may be formed by cross-linking a water-soluble or water-dispersible synthetic hydrophilic polymer, or it may be formed by polymerisation of appropriate monomers or pre-polymers (either in the presence of the aqueous pyrophosphate, or in the absence thereof). When formed from a hydrophilic polymer, the latter is preferably linear and thermoplastic, and may have:

(i) pendant carboxylic or sulphonic groups, in which case it is preferably cross-linked by reaction with cations of a polyvalent metal (in which case the polymer and the source of the cations of polyvalent metal are preferably as described in detail in the above-mentioned European Pat. No. 99); and/or (ii) functional groups which are cross-linkable by a covalent cross-linking mechanism (in which case the polymer and cross-linking agent therefor are preferably as described in detail in the above-mentioned European Pat. No. 11411).

Hydrogel matrices for heat storage materials are also disclosed in British Specification No. 2094333 and Japanese Patent Application Publication No. 57/82696 (Application No. 55/158224).

It is particularly preferred that the cross-linked polymer in such a hydrogel matrix retains active hydrophilic groups (that is, they are not blocked during cross-linking). For example, where the hydrogel is produced from a polymer of an ethylenically unsaturated monomer or monomers having carboxy groups (such as a polyacrylamide), the polymer preferably contains at least 20% of units containing carboxy groups.

A heat storage material according to the invention containing a hydrogel matrix may, if desired, contain a dispersant which facilitates uniform and rapid solution of the polymer. Examples of such dispersants include certain organic liquids which are miscible in water. Particularly preferred such organic liquids are lower aliphatic alcohols, such as methanol or ethanol.

When such a water-miscible organic liquid is included (for example when the polymer is not highly water-soluble, but only sparingly water-soluble or water-dispersible), it is preferably present in a relatively minor amount, compared with water, for example from 5 to 25% based on the weight of water.

The polymer matrix may also be an open-cell foam structure, for example, as disclosed in European Specification No. 56591. A preferred polymer for such a structure is an elastic polyurethane (again, as disclosed in European Specification No. 56591); alternatively, the polymer may be one of those disclosed in U.S. Pat. No. 4,003,426. In any case, the polymer matrix should not be one which includes essentially closed cells containing the pyrophosphate: the pyrophosphate regions should be substantially interconnected, in order to minimise supercooling effects.

A further example of a polymer matrix which may be used in the material according to the invention is produced by polymerisation of a monomer/prepolymer syrup (such as a methyl methacrylate syrup) in an aqueous emulsion. Such a syrup is available from ICI under the designation MDR-80.

The polymer matrix and the sodium pyrophosphate are preferably used in such amount that the storage material contains a major proportion, by weight, of the polymer matrix, whereby the resulting material may have an advantageously high heat capacity per unit volume. For example, when the polymer is in the form of a hydrogel, the proportion thereof may be 0.1 to 10%, preferably 2 to 8% (for example, about 5%) based on the weight of the material according to the invention.

In order to minimise supercooling, the material may be nucleated, for example, by a heat-transfer method as disclosed in U.S. Pat. No. 2,677,243, by careful control of the proportions of the ingredients of the composition, or by addition of an insoluble nucleating agent. Sometimes the polymer matrix may act as the nucleating agent.

The heat storage material according to the invention preferably contains water in an amount sufficient to hydrate all the anhydrous form of the sodium pyrophosphate. Water may be present in excess in some circumstances, but this reduces the heat storage capacity of the material.

The material according to the invention is preferably used in a method of heat exchange which comprises alternately heating the material to a temperature above about 80° C., and allowing the heat storage material to cool below its transition temperature, with evolution of heat.

The alternate heating and cooling of the material can be repeated for many cycles. In use, the material is preferably retained in a receptacle of a gas- or vapour-barrier material.

In a preferred embodiment, the material according to the invention is retained in sealed plastics tubes, such as polypropylene tubes. Such tubes may be stacked vertically in a tank through which a heat exchange fluid is periodically heated, for example, in a heater operating at low tariff periods.

In order that the present invention may be more fully understood, the following Examples are given by way of illustration only.

EXAMPLE 1

72 grams of water soluble polyacrylamide available commercially from Allied Colloids Ltd. as WN33 was dissolved in 790 grams of water at room temperature to form an acrylamide gel. (WN33 has an average molecular weight of about 6 million and a ratio of carboxyl:amide radicals of 7:3.)

The gel was placed in a vacuum-type mixer and heated to 80° to 85° C.; 1064 grams of anhydrous sodium pyrophosphate (also heated to 80° to 85° C.) was gradually added, with stirring, followed by 7.2 cm$^3$ of formalin (an aqueous solution containing approximately 40% by weight of formaldehyde and 14% by weight of methanol). The mixture was then heated for one day at 85° C.

The resulting composition was subjected to a thermal cycling test by alternately heating to 85° C. and cooling to 40° C. The transition temperature was reproducible, being 69°–70° C. in each case.

EXAMPLE 2

10.0 kg of a polymer similar to that used in Example 1 (except that it had a molecular weight of 10–15 million and a carboxy:amide ratio of 40:60) was dissolved in 101.5 kg of water containing one liter of formalin, all at 50° C., and 150 kg of pure anhydrous sodium pyrophosphate was mixed therewith under vacuum conditions, the mixture being heated to 72° C.

The mixture was pumped into polypropylene tubes, which were sealed and maintained at a temperature of 60° C. for five days.

The tubes were stacked vertically in a tank through which heat-exchange liquid was circulated. The fluid was periodically heated to 84° C. and allowed to cool to 40° C.; reproducible thermal arrests were obtained in the heat storage material in the tubes for many cycles.

EXAMPLE 3

200 grams of finely powdered sodium pyrophosphate decahydrate was intimately mixed with 100 grams of methyl methacrylate polymer syrup (available commercially from ICI as MDR-801), 2.5 grams of benzoylperoxide in a phthalate plasticiser (available commercially from Interox Chemicals Ltd.) and 5 grams of dimethyl aniline; highly exothermic polymerisation took place.

The resulting composition was sealed vapour-tight in a polypropylene tube and subjected to thermal cycling as in Example 2. Reproducible thermal arrests were obtained for many cycles.

EXAMPLE 4

50 grams of a powder containing 18% by weight polyacrylamide (polymerised in a saturated aqueous solution of sodium pyrophosphate) was intimately mixed with 100 grams of anhydrous sodium pyrophosphate and added to water at 90° C. in such amounts that the resulting composition contained 3.7% by weight of polymer (and the stoichiometric amount of water).

The resulting composition was sealed vapour-tight in a polypropylene tube and subjected to thermal cycling as in Example 2. Reproducible thermal arrests were obtained for many cycles.

In another run, the polyacrylamide was polymerised in water (in the absence of sodium pyrophosphate) and then mixed with anhydrous sodium pyrophosphate to produce a composition having the same analysis. Similar results were obtained in the thermal cycling test.

We claim:

1. A heat storage material which comprises sodium pyrophosphate decahydrate dispersed throughout an open cell polymeric matrix which is stable in an aqueous medium at 80° C., the polymeric matrix being present in a minor amount.

2. A heat storage material according to claim 1, in which the polymeric matrix comprises a water-swollen cross-linked polymer hydrogel.

3. A method of heat exchange which comprises alternately heating a material according to claim 1 or 2 to a temperature of above 80° C., and allowing said material to cool below the transition temperature thereof.

* * * * *